Figure 1:
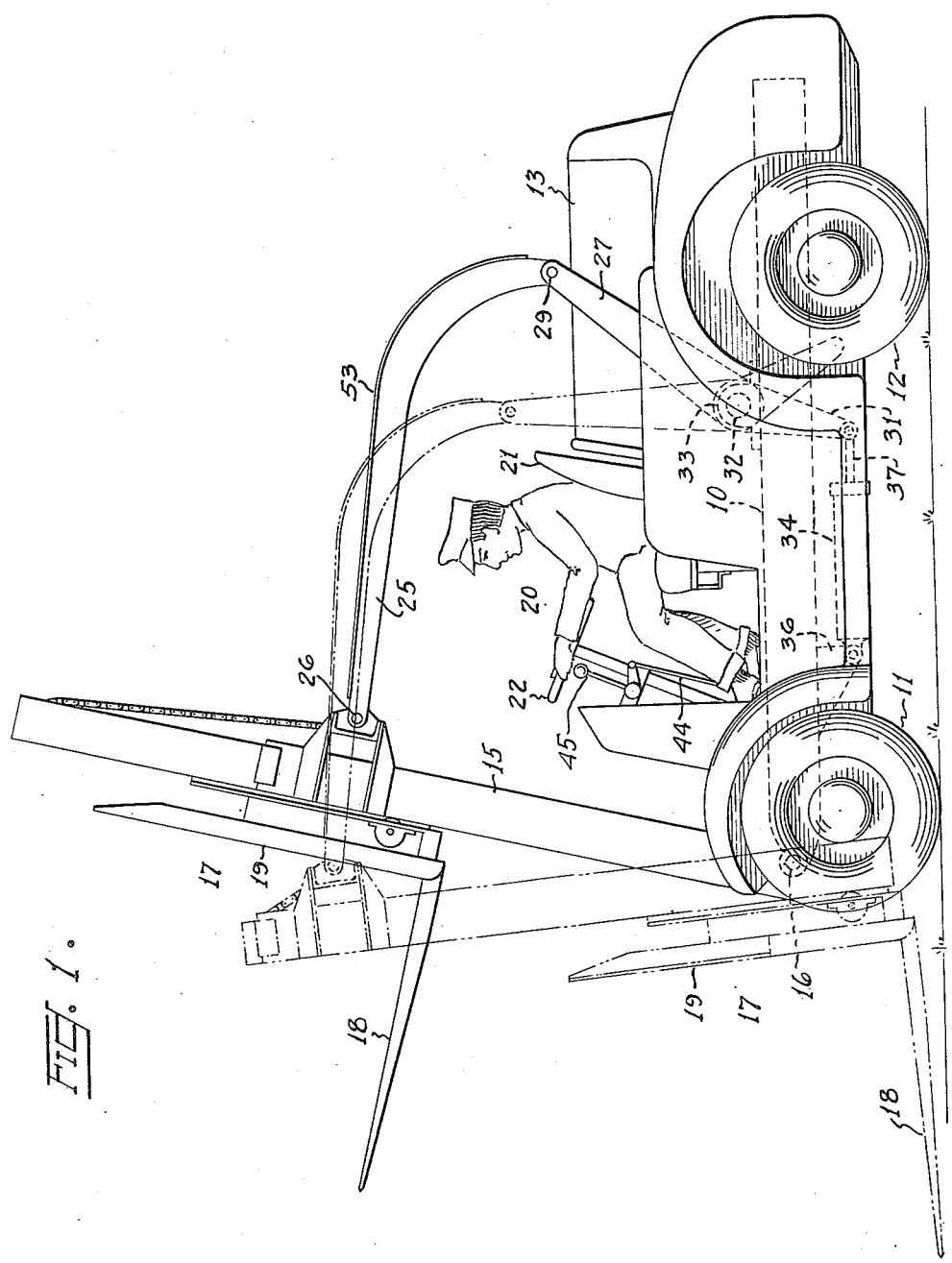

May 23, 1944.　　　　G. V. JOHNSON　　　　2,349,352
INDUSTRIAL TRUCK
Filed Jan. 19, 1942　　　　3 Sheets-Sheet 1

INVENTOR
GEORGE V. JOHNSON

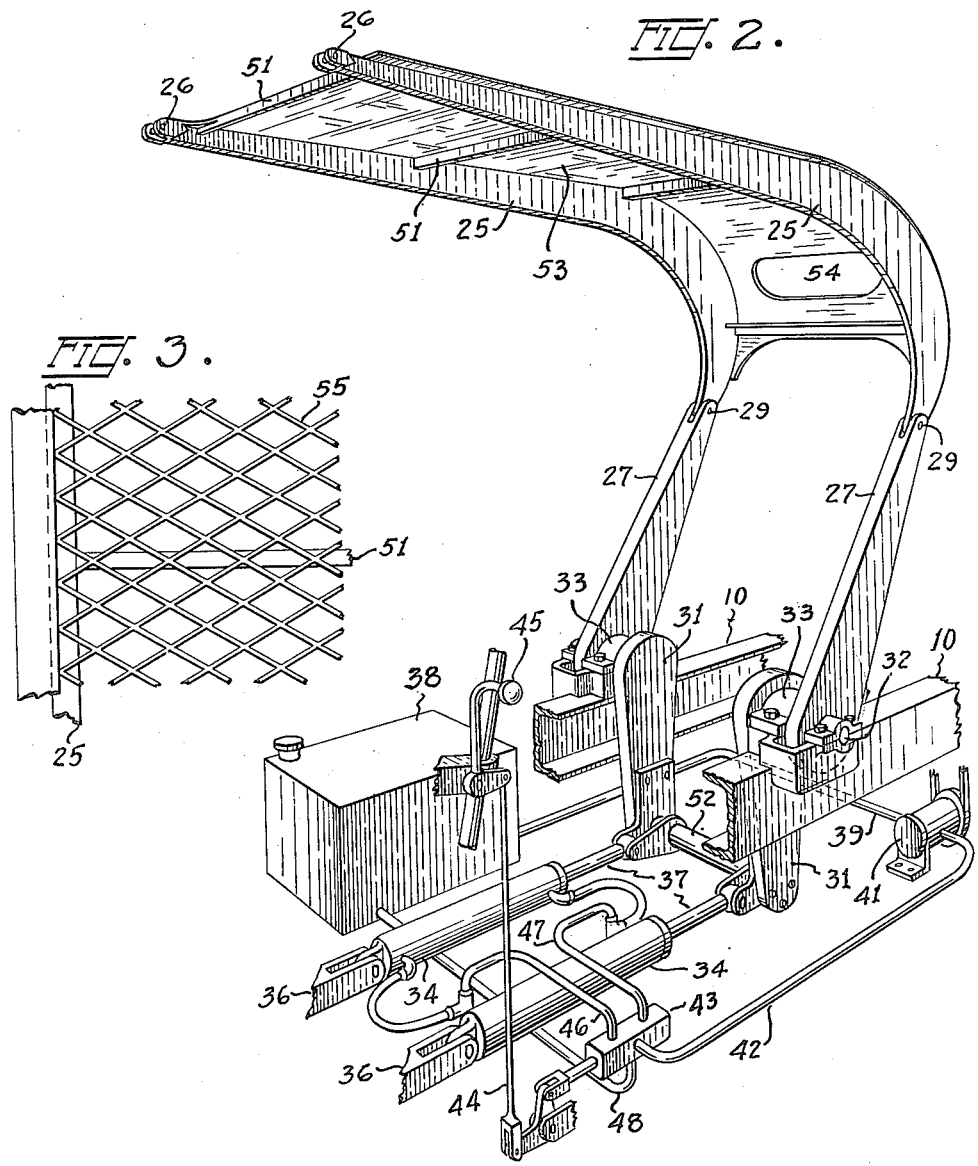

May 23, 1944.   G. V. JOHNSON   2,349,352
INDUSTRIAL TRUCK
Filed Jan. 19, 1942   3 Sheets-Sheet 3
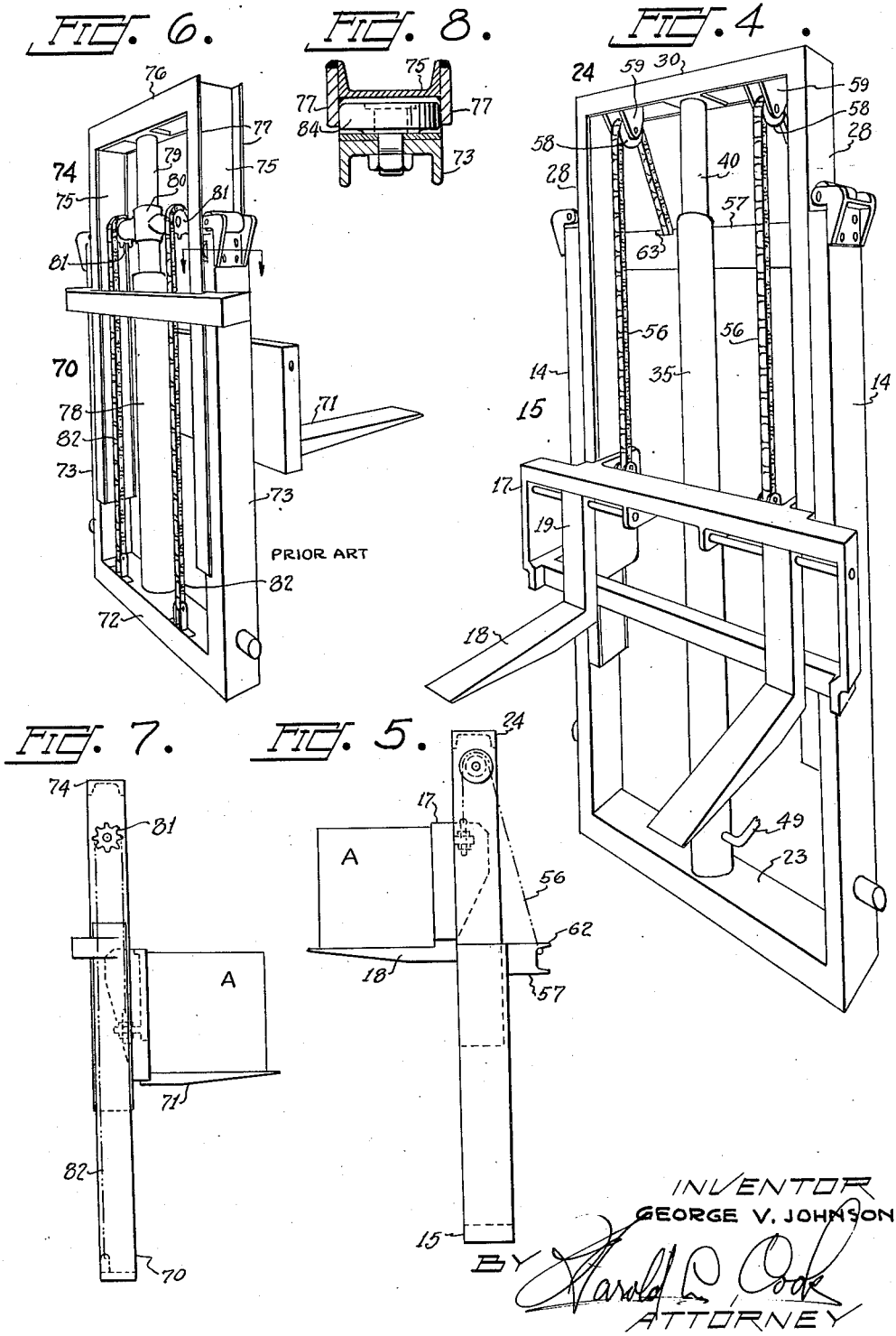

Patented May 23, 1944

2,349,352

UNITED STATES PATENT OFFICE 2,349,352

INDUSTRIAL TRUCK

George V. Johnson, Portland, Oreg., assignor to Willamette Hyster Company, Portland, Oreg., a corporation of Oregon Application January 19, 1942, Serial No. 427,347

16 Claims. (Cl. 214—113)

This invention relates to industrial trucks, and more particularly to an improved load handling means for front end lift trucks.

Industrial trucks for handling loads in manufacturing plants, warehouses, and the like, generally comprise a relatively short wheel-base vehicle having a power unit at one end and a load handling mechanism at the opposite end. The load handling mechanism usually includes a generally vertically extending upright, sometimes of a telescopic type, and a load engaging platform mounted on the upright for vertical movement thereon. The upright is pivoted adjacent its lower end onto the truck frame to enable the platform to be tilted rearwardly for shifting the load rearwardly of the vehicle to effect a more nearly uniform distribution of the weight on the truck, and for enhancing the safety of the load on the platform.

For raising loads to relatively high elevations and lowering them therefrom, the upright may be quite tall, or comprise a plurality of telescopic members for enabling the elevation of the load supporting platform to a considerable height above the vehicle frame. With the usual type of lift truck a load in an elevated position upon the upright tends to sway considerably, due to flexing, twisting or bending movements of the structural members of the load handling mechanism. In industrial trucks commonly in use, a mechanism for tilting the upright is attached to the upright at a point adjacent its lower end, and in such constructions the upright is unsupported from this point upward against flexing, twisting or swaying movements. Such swaying seriously interferes with accurate manipulation of the load, and may cause parts of the load to become dislodged from the load supporting platform.

Furthermore, industrial trucks are usually provided with a space for an operator, which may comprise a seat or merely a standing platform, from which the truck is controlled. In manipulating elevated loads, a portion or all of the load may be a considerable distance above the operator. Due to miscalculation or impaired overhead clearances a portion of the load on the platform may be jarred and caused to fall therefrom. Merely while traveling along a driveway a sharp obstruction may be struck with one of the wheels of the vehicle, causing a jolt sufficient to dislodge a part of the load; or a sudden gust of wind may flip a board, sheet of tin or the like, from a load of such material on the platform. Usually no protection is provided for the truck operator against the danger from portions of the load falling from the elevated platform.

In accordance with the illustrated embodiment of the invention, an industrial truck is provided having a normally vertically extending upright pivotally mounted adjacent the lower end thereof to the truck frame and having a load handling platform mounted for vertical movement on the upright. A tilting mechanism is pivotally connected to the upper portion of the upright, and comprises a pair of arms which extend in a generally horizontal relation rearwardly over the operator's space on the truck to a point therebehind. A lever mechanism is pivotally connected to the ends of the arms for supporting such arms in a spaced relation above the operator's space. Motor means mounted on the frame are connected to the levers for determining the angular relation of the upright with respect to the vehicle frame and thus controlling the tilting movement thereof, as well as acting as a stabilizer for the upper end of the upright. The horizontal arms extending over the operator's space are provided with means extending therebetween forming a roof or a shield affording protection to an operator stationed therein as against objects falling from above, either from a storage pile adjacent which he may be working, or from the elevated load platform.

It is, therefore, a general object of the present invention to provide an industrial truck with a new and improved load handling mechanism whereby the upright is effectively stabilized during an elevated and loaded condition of the platform.

It is a further object of the invention to provide a new and improved industrial truck arrangement having a load handling mechanism mounted on one end thereof which includes a load elevating platform and means providing protection to the truck operator from objects falling from above.

A further object of the invention is to provide an industrial truck of the type described having a new and improved arrangement for stabilizing a load carried thereby in an elevated condition and also for effecting a tilting movement of the load handling mechanism.

A further object of the invention is to provide in an industrial truck having a load handling mechanism at one end thereof a new and improved arrangement for stabilizing such mechanism and effecting tilting movements thereof while simultaneously affording protection to the truck operator.

Further objects and advantages of the invention will appear from the following description, taken in connection with the accompanying drawings, while the features of novelty characterizing the invention will be pointed out with greater particularity in the appended claims.

In the drawings, Figure 1 is a side elevation illustrating an industrial truck constructed in accordance with one form of the invention; Figure 2 is a view in perspective, illustrating more clearly the structural arrangement of the operating mechanism of the invention; Figure 3 is a fragmentary view of one detail of the invention illustrating a modification thereof; Figure 4 is a perspective view of the upright structure mounted on one end of the truck and showing the power means for elevating the load engaging platform; Figure 5 is a side elevation of the upright structure showing in broken lines the direction of pull exerted by the lift chains; Figure 6 is a perspective view of an upright structure such as may be mounted on the front end of a lift truck and which is explanatory of certain advantages of the invention; Figure 7 is a side elevation of the upright structure shown in Figure 6, showing in broken lines the direction of pull exerted by the lift chains; and Figure 8 is a sectional view taken on the line 8—8 of Figure 6.

Referring to the drawings, an industrial truck is shown comprising a main frame 10 suitably supported on sets of wheels 11 and 12 and provided with a motor enclosed in the hood 13. The truck is provided with a load handling mechanism comprising a generally vertically extending upright structure 15, shown in this instance as being of the telescopic type, and which is mounted adjacent its lower end to one end of the truck frame 10 by a horizontal pivot indicated at 16. A load engaging member or platform, indicated generally at 17, and comprising outwardly extending arms 18 and an apron 19, is mounted for vertical movement upon the upright structure 15. An operator's compartment, indicated generally at 20, having a seat 21 and truck controls including a steering wheel 22, is provided on the vehicle frame 10 between the motor and the load handling mechanism.

The upright structure 15 comprises a lower frame section 23 having a pair of vertically extending channel shaped uprights 14 within which is telescopically mounted an upper frame section 24 comprising a pair of uprights 28 tied together by a cross member 30.

Mounted between the uprights 14 is an hydraulic cylinder 35 from which projects a piston rod 40 carrying on its outer end the cross member 30 of the upper frame section 24. Fluid under pressure from the pump 41 is transmitted through a valve (not shown) to the line 49 and into the lower end of the lift cylinder 35 to effect upward movement of the piston rod 40 to raise the cross member 30. A pair of lift chains 56 are anchored at one end to a cross member 57 secured to the upper ends of the uprights 14 and are trained over laterally spaced sprockets 58 journaled in brackets 59 depending from the cross member 30. At their opposite ends the chains 56 are connected to the load supporting platform 17. Rollers carried by the load supporting platform 17 are mounted for vertical movement within the channels of the uprights 28 of the upper frame section 24.

Elevation of the upper frame section 24 results in relative movement of the load supporting platform 17 with respect to the upright structure 15, the load supporting platform 17 being raised relative to the upper frame section 24 as the frame section 24 is elevated with respect to the lower frame section 23.

It will be noted that the cross member 57 extends some distance to the rear of the uprights 14, being supported on the ends of angle members 61 suitably secured to the channel members 14. In a modified structure as shown in Figure 5 the cross member 57 may be made in the form of a U with the ends thereof attached to the uprights 14 and the middle portion of the cross member spaced rearwardly from the rear surface of the uprights. The cross member 57 may be in the form of a channel so mounted on the uprights that the flanges 62 thereof extend rearwardly. Openings 63 are provided in the upper one of these flanges 62 for receiving and anchoring the ends of the chains 56.

When the upright structure 15 is completely telescoped, i. e., when the upper frame section 24 occupies its lowermost position, that portion of the chains 56 between the sprockets 58 and the cross member 57 extends rearwardly at nearly right angles to that portion of the chain between the sprockets 58 and the load supporting platform 17. As the upper frame section 24 is raised and the load carrying platform 17 is elevated, any tendency for the frame section 24 to sag forwardly under the load on the load supporting platform is counteracted by the rearward pull on the chains 56 which reacts through the sprockets 58 to maintain the verticality of the upper frame section 24.

The advantages of the construction illustrated in Figures 4 and 5 will better be understood by comparing the structures shown in Figures 4 and 5 with the structure shown in Figures 6 and 7. In Figures 6 and 7 is illustrated a construction heretofore employed in industrial trucks comprising an upright structure 70 having a load supporting platform 71 mounted thereon for vertical movement relative thereto. The upright structure 70 comprises a lower section 72 having a pair of vertically extending channel shaped uprights 73, and an upper section 74 having a second pair of uprights 75 telescopically mounted in the uprights 73 and tied together at their upper ends by a cross member 76.

Mounted between the uprights 73 is an hydraulic cylinder 78 from which projects the piston rod 79 carrying a cross head 80 having laterally spaced sprockets 81 over which are trained lift chains 82, anchored at one end to the cross member at the lower end of the lower section 72, and which at their opposite ends are connected to the load supporting platform 71. With this construction, raising of the cross head results in relative movement of the load supporting platform 71 with respect to the upright structure 70, and, as the cross head 80 is moved upwardly, the upper section 74 being moved conjointly therewith, the load supporting platform is raised relative thereto to its extreme upper position, at which the uprights 75 have moved outwardly of the uprights 73 and the load supporting platform has moved to the top of the upper frame section 74.

In prior art constructions that portion of the lift chains 82 between the sprockets 81 and the frame section 72 is disposed in the plane of the upright structure 70, and the stresses imparted by the load A on the load supporting platform 71 tend to tip the upright structure in a forward direction. This tendency is proportionately increased as the load supporting platform is moved to extreme upper position. In these structures provision was made for stabilizing the upper frame section as it telescoped outwardly of the lower frame section of the upright by means of guide bars 77 welded to the uprights 75 and by means of rollers 84 fixed to the upper ends of the uprights 73 for engaging said bars.

In the new and improved structure embodying the present invention, that portion of the lift chains 56 between the sprockets 58 and the frame section 23 extends rearwardly at an angle to the plane of the upright structure 15 and the stresses imposed by the load A on the load supporting platform 17 are counteracted by the stresses imposed in the opposite direction by the cross member 57. By mounting the cross member 57 in spaced relation to the plane of the upright 15, and so providing an anchorage for the lift chains in opposition to the load on the load supporting platform, the upright structure is effectively stabilized, especially in those positions where it is most frequently used, namely, throughout the lower half of the permitted movement of the upper frame section. An advantage of the construction is that guide bars 77 and rollers 84, or an equivalent structure, such as employed in prior art structures, is not required for providing stability to the upper frame section in its extended position.

A combined stabilizing and tilting mechanism is provided for the upright structure 15 and which comprises a pair of arms 25 pivotally connected as at 26 to the upper portion of the upright 15. The arms 25 extend generally rearwardly in a parallel spaced relation over the operator's space 20 and to a point therebehind. Extending upwardly from the opposite side members of the truck frame 10 are a pair of levers 27, the upper ends of which are pivotally connected as at 29 to the corresponding ends of the arms 25 and support the arms 25 in a spaced relation above the operator's space 20. The levers 27 include portions 31 rigidly secured thereto by means of stub shafts 32 which are journaled in suitable bearings 33 mounted on the frame members 10.

Motor means are operatively connected to the lower ends of the lever portions 31 for determining the pivotal movement thereof upon the frame 10. In this instance the motor means comprises a pair of servo-motors 34 having cylinders suitably secured relative to the truck frame by brackets 36 and by piston rods 37 connected by suitable coupling means to the lower extremities of the lever portions 31. The movement of lever arms 27 is limited by the length of stroke of the pistons 37 in the servo-motors 34. Operating fluid for the servo-motors 34 is supplied from a reservoir 38 through conduit 39, motor driven pump 41, supply conduit 42, and the control valve 43. The valve 43 may be of any suitable type well known in the art, and may be connected through linkage 44 to an operating lever 45 which may be mounted adjacent the steering column in the operator's compartment. By control of the valve 43 pressure fluid may be supplied selectively to corresponding opposite ends of the motors 34 through the conduits 46 and 47, while the exhaust fluid may be returned through conduit 48 to the reservoir 38.

By controlling the energization of the motors 34 the upright 15 of the load handling mechanism may be caused to move to any desired angular position between its two limit positions. In broken lines in Figure 1, the upright 15 is shown in the forward tilted position and with the platform 17 in the lowered position for picking up a load from the floor. In full lines, the upright is shown in the rearwardly tilted position and the platform 17 in a partially elevated position.

In order to add rigidity to the load handling mechanism the tilting mechanism for the upright 15 is connected to the upper portion of the first section thereof at a point above the operator's compartment 20, and the arms 25 are connected together by a plurality of transverse braces 51 for preventing relative movement therebetween. Similarly, the levers are connected together by a relatively heavy rod 52 secured between the extremities of the lever arms 31. While it will be obvious that but one motor may be provided, if desired, for operating the levers 27—31, two similar motors 34 are provided, operating in unison, one connected to each of the lever arms 31 for convenience in mounting the vehicle motor. The levers 27—31 are made of relatively rugged proportions so as to be incapable of flexing, twisting or bending movements.

As shown more clearly in Figure 2, a sheet metal plate 53 is provided across the space between the arms 25 extending over the driver's compartment, forming a roof thereabove and affording substantial protection to the operator as regards objects which may fall toward him from above.

For manipulating loads with the load handling platform in elevated position, a solid sheet provided between the horizontal arms 25 might impair upward vision of the operator. It will be obvious that such a sheet could be substituted by a suitable screening 55 in a manner indicated in Figure 3. For the same reason, an opening 54 may be provided in the rear of the sheet covering for the arms 25 permitting vision to the rear of the truck from the operator's compartment.

Having described the principle of my invention in what is considered to be a preferred embodiment thereof, it is desired that it be understood that the specific details shown are merely illustrative, and that the invention may be carried out by other means.

I claim:

1. An industrial truck comprising a chassis, a normally vertically extending load supporting frame pivotally mounted on said chassis adjacent the lower end of said frame, a load supporting member mounted for vertical movement on said frame, an operator's compartment on said chassis, actuating means pivotally connected to said frame for effecting tilting movement thereof and including at least a portion extending over said operator's compartment and downwardly behind the operator and providing protection for an operator therein from objects falling from above, and controllable power means for driving said actuating means for determining the angular relation of said load supporting frame and said chassis.

2. An industrial truck, a chassis, supporting wheels therefor, a normally vertically extending upright pivotally mounted on said chassis adjacent one end of said chassis, a load supporting member mounted for vertical movement on said upright, an operator's compartment on said chassis, actuating means for effecting tilting movement of said upright comprising means pivotally connected to the upper portion of said upright and extending rearwardly therefrom over said operator's compartment and affording protection to an operator in said compartment from objects falling from above, and controllable power means for driving said actuating means.

3. An industrial truck comprising a frame, a normally vertically extending upright pivotally mounted adjacent one end of said frame, a load engaging member mounted for vertical movement on said upright, an operator's compartment on said frame, means for effecting tilting movement of said upright comprising a pair of spaced generally horizontal members connected to said upright adjacent the upper end thereof and extending rearwardly over said operator's compartment, operating means connected to said horizontal members for effecting tilting movement of said upright, and means extending between said horizontal members forming a roof over said operator's compartment.

4. An industrial truck comprising a frame, a normally vertically extending upright horizontally pivoted on said truck frame adjacent one end thereof, a load engaging member mounted for vertical movement on said upright, an operator's space on said frame, means forming a roof over said space and connected at the forward end to an upper portion of said upright, a pair of levers pivotally mounted on said frame to the rear of said space, said levers being pivotally connected at their upper ends to said roof forming means and supporting said means above said space, and motor means connected to said levers for effecting pivotal movement thereof and causing tilting of said upright.

5. An industrial truck comprising a frame, a generally vertically extending load handling mechanism pivotally mounted on an end of said frame, an operator's space on said frame, a motor on said frame for operating said load handling mechanism, and means operatively connected at one end to said load handling mechanism and extending rearwardly over said space and forming substantially a roof thereabove, said means being connected to said motor on the opposite side of said space with respect to said load handling mechanism.

6. An industrial truck comprising a frame, an upright pivotally mounted adjacent the lower end thereof on one end of said frame, a load engaging member mounted for vertical movement on said upright, an operator's space on said frame, means for stabilizing the upper end of said upright when said load engaging member is in a loaded and elevated condition, said stabilizing means comprising at least one arm pivotally connected to said upright adjacent the upper end thereof and extending rearwardly over said operator's space, motor means mounted on said frame and operatively connected to the end of said arm opposite said upright for controlling the relative angular position of said upright.

7. An industrial truck comprising a frame, an upright pivotally mounted adjacent the lower end thereof on one end of said frame, a load engaging member mounted for vertical movement on said upright, an operator's space on said frame, means for stabilizing the upper end of said upright during the elevated and loaded condition of said load engaging member, said stabilizing means comprising at least one arm pivotally connected to the upper end of said upright and extending rearwardly over said operator's space, a lever pivoted on said frame, the upper end of said lever being pivotally connected to the end of said arm, motor means connected to said lever for determining the angular position of said upright relative to said frame, and means on said arm forming substantially a shield over said operator's space.

8. An industrial truck comprising a frame, a normally vertically extending upright pivotally mounted on said frame, a load engaging member mounted for vertical movement on said upright, an operator's space on said frame, means for tilting said upright comprising a cylinder and piston, rigid connecting means pivotally connected to said upright and to said piston and extending generally horizontally above said space.

9. An industrial truck comprising a frame, a normally vertically extending upright pivotally mounted adjacent one end of said frame, a load engaging member mounted for vertical movement on said upright, an operator's space on said frame, a rigid actuating member for tilting said upright secured thereto and extending rearwardly over said space, means mounted on said frame for driving said actuating member, and means connecting said driving means and said member on the opposite side of said space with respect to said upright.

10. An industrial truck comprising a frame, a normally vertically extending upright pivotally mounted on said frame adjacent one end thereof, a load engaging member mounted for vertical movement on said upright, an operator's seat on said frame, a rigid member secured to said upright adjacent the upper end thereof and extending rearwardly therefrom in a spaced relation above said operator's seat and to a point therebehind, and motor means mounted on said frame and operatively connected to said member behind said seat for effecting tilting movement of said upright.

11. An industrial truck comprising a frame, a normally vertically extending upright pivotally mounted adjacent one end of said frame, a load engaging member mounted for vertical movement on said upright, an operator's compartment on said frame, means for effecting tilting of said upright including a pair of spaced arms pivotally connected adjacent the upper end of said upright and extending rearwardly in a generally parallel spaced relation above said operator's compartment and to a point therebehind, a pair of lever arms pivotally mounted on said frame and extending upwardly therefrom, the upper ends of said lever arms being pivotally connected to the ends of corresponding of said first pair of arms, and motor means connected to said lever arms for effecting tilting movement of said upright.

12. An industrial truck comprising a frame, a normally vertically extending upright guide frame mounted on a horizontal pivot adjacent one end of the truck frame, a load engaging member mounted for vertical movement on said upright, an operator's compartment on said frame, means forming a roof over said compartment connected to the upper portion of said upright and extending rearwardly therefrom to a point behind said compartment, an operating means on said frame and operatively connected to said roof forming means for effecting tilting movement of said upright.

13. An industrial truck comprising a frame, a normally vertically extending upright mounted on a horizontal pivot adjacent one end of said frame, a load engaging member mounted for vertical movement on said upright, an operator's compartment on said frame, a pair of arms pivotally connected to an upper portion of said upright and extending rearwardly therefrom in a substantially parallel spaced relation above said compartment and to a point therebehind, a pair of levers pivoted intermediate their ends on said frame, the upper ends of said levers being pivotally connected to adjacent ends of corresponding of said arms, motor means mounted on said frame and pivotally connected to the opposite ends of said levers, control means for said motor for effecting tilting of said upright thereby, and means extending between said arms forming a shield over said operator's compartment and affording protection to the operator therein from objects falling from above.

14. An industrial truck comprising a chassis, a load supporting frame pivotally mounted on said chassis, an operator's space on said chassis, a load engaging member mounted on said supporting frame for engagement under a load, actuating means mounted on said chassis for moving and holding said load supporting frame in a plurality of different angular positions with respect to said chassis, said actuating means being connected to said load supporting frame by rigid connecting means extending over said operator's space and pivotally connected to said actuating means and to the upper end of said frame.

15. In an industrial truck, a chassis, a vertically extending upright mounted adjacent one end of said chassis, said upright comprising a frame pivotally mounted on said chassis, a second frame telescopically mounted in said first frame, means for moving said second frame relative to said first frame comprising a cylinder and piston, said cylinder being mounted in said first frame, and said piston being directly connected to said second frame, a load engaging member mounted for vertical movement on one side of said upright, means for moving said load engaging member comprising a chain, one end of said chain being secured to said load engaging member, the opposite end of said chain being secured to said first frame at a point opposite said load engaging member and at a distance from the plane of said upright, a sprocket journaled adjacent the upper end of said second frame, said chain being trained over said sprocket.

16. In an industrial truck, a chassis, a vertically extending upright mounted adjacent one end of said chassis, said upright comprising a frame pivotally mounted on said chassis, a second frame telescopically mounted in said first frame, means for moving said second frame relative to said first frame, a load engaging member mounted for vertical movement on said upright, laterally spaced sprockets journaled adjacent the upper end of said second frame, means secured to said first frame for securing a lift chain, said means being spaced from the side of said upright opposite the load engaging means, lift chains for moving said load engaging member, each said chain being trained over respective ones of said sprockets and having one end attached to said member and the other end attached to said means.

GEORGE V. JOHNSON.